Nov. 28, 1950     J. POWELL     2,532,192
SEED PLANTING MACHINE
Filed Oct. 18, 1948
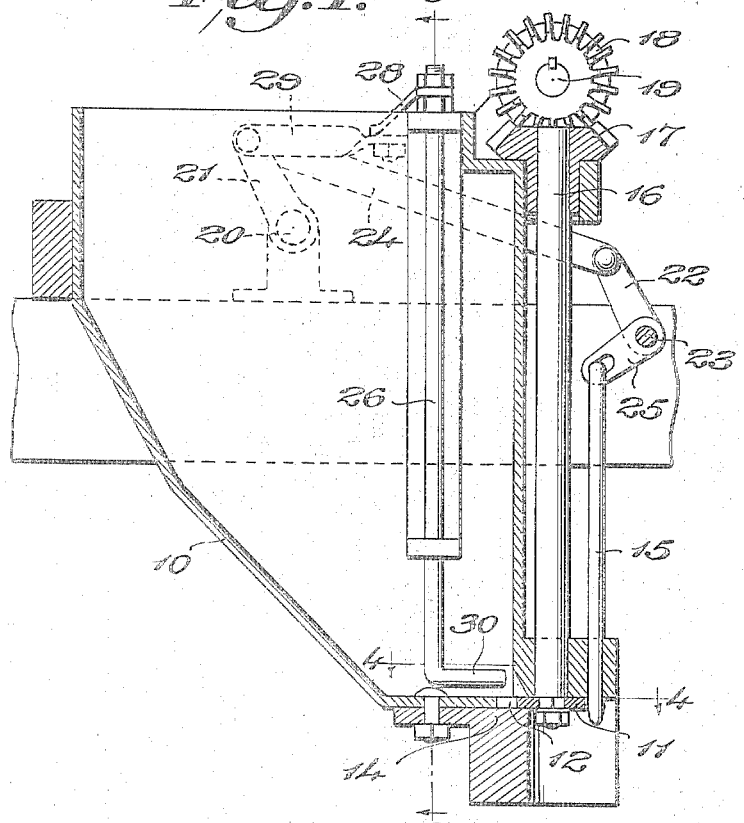
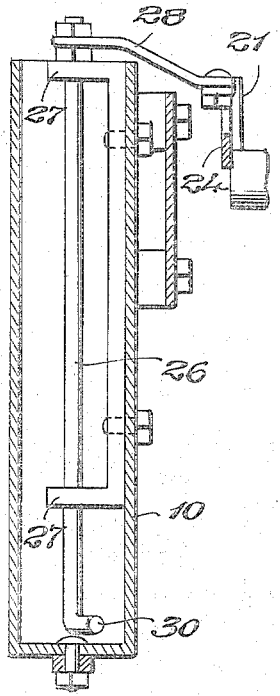
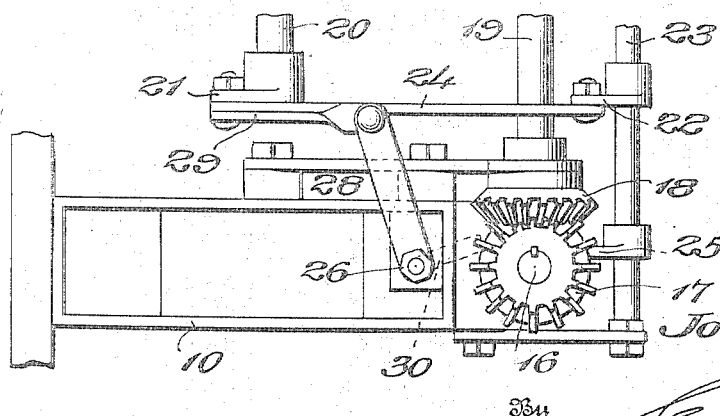
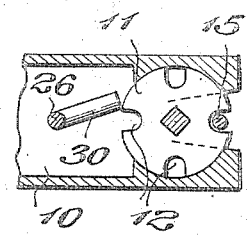
Inventor
John Powell, Patented Nov. 28, 1950

2,532,192

UNITED STATES PATENT OFFICE 2,532,192

SEED PLANTING MACHINE

John Powell, Kokomo, Ind.

Application October 18, 1948, Serial No. 55,123

5 Claims. (Cl. 222—217)

This invention relates to seed planting machines, and has particular reference to improvements in machines which are specially designed for planting tomato and other light weight seeds.

Conventional seed planting machines which depend for their operation upon seeds being dropped therefrom under the influence of gravity, cannot be used successfully for planting tomato and like seeds for the reason that such seeds, because of their light weight and tendency to adhere to one another, do not readily separate and drop, either singly or in small numbers, under the influence of gravity.

A known type of machine which is especially designed for planting tomato and similar seeds is illustrated, described and claimed in my prior application, Serial No. 759,656, filed July 8, 1947, and includes a seed hopper and a horizontally disposed, intermittently rotatable disc located at the bottom of the hopper and having therein a plurality of seed-accommodating pockets which, as said disc is intermittently rotated, receive seeds from the hopper and transfer them to a dropping point. Said machine additionally includes a reciprocable rod which is effective to positively eject from each pocket the seeds contained therein when the pocket reaches the seed dropping point. The machine thus operates positively to cause the seeds to be delivered in small measured quantities and consequently has proved to be highly successful in use. However, there are times, as when the seeds are damp, that they may fail, because of their tendency to cling together, even to gravitate from the hopper into the disc pockets, in which event the machine is, of course, ineffective to accomplish its purpose.

Accordingly, the object of the present invention is to provide, in a machine of the character referred to, simple, practical means to agitate the seeds in the hopper and thus insure their gravitation into the disc pockets despite their pronounced tendency at times to cling together, whereby any possibility of the machine failing to have seeds delivered therefrom at regular intervals is practically avoided.

With the foregoing object in view, the invention consists in the provision of means for the purpose stated embodying the novel features of construction, combination and arrangement of parts as are illustrated by way of example in the accompanying drawings and as will be hereinafter more fully described and claimed.

In the accompanying drawings, wherein like characters of reference denote corresponding parts in the different views:

Figure 1 is a vertical longitudinal section through a seed hopper and its related seed delivery means constructed in accordance with the invention;

Figure 2 is a top plan view of the structure shown in Figure 1;

Figure 3 is a section on the line 3—3 of Figure 1; and

Figure 4 is a section on the line 4—4 of Figure 1.

Referring to the drawings in detail, 10 designates a hopper to contain seeds, and 11 designates an intermittently rotatable disc which has marginal pockets 12 extending therethrough and which is disposed horizontally at the bottom of said hopper in a position such that the front marginal portion thereof extends into said hopper and its rear marginal portion overlies a space rearwardly of said hopper through which seeds may drop to the soil. Thus, as said disc is intermittently rotated, its marginal pockets 12 are moved successively to a position to receive seeds from the hopper and from that position to the seed dropping position.

To prevent seeds from dropping from the pockets 12 during travel of said pockets between their seed receiving position and their seed dropping position, a wall 14 underlies the pocketed marginal portion of the disc 11 between said positions.

The disc 11 may have only a single pocket 12 and may be rotatable through an angle of 180° to move said pocket between its seed receiving position and its seed dropping position, or said disc may have any desired plurality of pockets equally spaced apart angularly and may be rotatable through an angle of less than 180°, depending upon the number of its pockets, to bring one pocket to the seed receiving position and another pocket simultaneously to the seed dropping position. In the present instance, the disc 11 is illustrated as having four pockets 12. Therefore, rotation of said disc through an angle of 90° will result in one pocket 12 being moved to a position to receive seeds from the hopper 10 and in another pocket 12 simultaneously being moved to a position to drop to the soil seeds which it has previously received from said hopper.

To positively eject seeds from each pocket 12 when the latter reaches the seed dropping position, a reciprocable plunger 15 is provided. This plunger is disposed vertically above the rear marginal portion of the disc 11 and is suitably guided and actuated so that the lower end portion thereof is movable downwardly into each seed pocket 12 to eject seeds therefrom as each pocket moves to its seed dropping position.

The disc 11 is mounted on the lower end of a vertical shaft 16 which is journaled for rotation in suitable bearings carried by the hopper 10 and which carries at its upper end a miter gear 17. Meshing with the miter gear 17 is a second miter gear 18 which is carried by a horizontal shaft 19. By means as illustrated and described in my aforesaid prior application, or by any other suitable means with which the present invention is not particularly concerned, the shaft 19 is intermittently rotated as the seed planting machine advances so that at regular intervals the disc 11 is intermittently rotated to move an empty pocket 12 to the seed receiving position and a filled pocket 12 to the seed dropping position.

A second horizontally disposed shaft 20 is located forwardly of the shaft 19 and by means as illustrated and described in my aforesaid prior application, or by any other suitable means, is rocked through a suitable angle once for each step or increment of rotation of the disc 11.

On the shaft 20 is an arm 21 which is connected to an arm 22 on a stub shaft 23 by a link 24, while on said stub shaft 23 is an arm 25 which is connected to the plunger 15. Thus, rocking of the shaft 20 effects rocking of the stub shaft 23 and reciprocation of the plunger 15. The means for rocking of the shaft 20 is timed with respect to the means for intermittently rotating the disc 11 so that each time a seed pocket 12 moves to the seed dropping position, the plunger 15 is depressed to positively eject seeds from the pocket and then is retracted.

Referring now to the seed agitating means constituting the present invention, 26 designates a shaft which is mounted vertically in the hopper 10 in suitable bearings 27 and which is offset forwardly from the front marginal portion of the disc 11. At its upper end this shaft 26 has secured thereto and extending laterally therefrom an arm 28 which is connected by a link 29 with the arm 21 on the shaft 20 or, equivalently and if desired, with another arm on said shaft 20. Thus, each time the shaft 20 is rocked, the shaft 26 also is rocked. Extending laterally and rearwardly from the lower end of the shaft 26 is an arm 30 which is spaced only a short distance above the bottom of the hopper 10 and which, by rocking of said shaft 26, is caused to sweep across the front marginal portion of the disc 11 once for each increment of rotation of said disc. Thus, each time a new pocket 12 is moved to the seed receiving position, the sweep arm 30 acts to disturb or agitate the seeds in the hopper 10 directly over and adjacent to the pocket 12 so that the seeds gravitate freely into said pocket. In this way, each pocket 12 is practically assured of receiving seeds from the hopper 10, and since the plunger 15 acts positively to eject from each pocket 12 the seeds contained therein when each pocket moves to the seed dropping position, any possibility of the machine failing to plant seeds at regular intervals as the machine advances is practically eliminated.

From the foregoing description considered in connection with the accompanying drawings, it is believed that construction and operation of the means constituting the present invention will be clearly understood. It is desired to point out, however, that while only a single structural embodiment of said means has been illustrated and described, the same is readily capable of specifically different structural embodiments within the spirit and scope of the invention as defined in the appended claims.

I claim:

1. A seed dropping mechanism comprising a seed hopper, a rotatable horizontally disposed disc having one marginal portion thereof extending into the bottom part of said hopper and another marginal portion thereof overlying a free space through which seeds may gravitate to the soil, said disc having in the marginal portion thereof seed accommodating pockets, means to rotate said disc intermittently to bring one pocket therein to a position to receive seeds from said hopper and simultaneously to bring another pocket therein into overlying relationship to said space, means operable to eject seeds from each pocket when the latter is brought into overlying relationship to said space, an oscillatory arm in the hopper having an amount of oscillation to disturb the seeds therein only adjacent to the marginal portion of said disc which extends into said hopper to cause seeds to gravitate from the hopper into each pocket when the latter is moved to a position to receive seeds from said hopper, and means for oscillating said arm.

2. A seed dropping mechanism comprising a seed hopper, a rotatable horizontally disposed disc having one marginal portion thereof extending into the bottom part of said hopper and another marginal portion thereof overlying a free space through which seeds may gravitate to the soil, said disc having in the marginal portion thereof seed accommodating pockets, means to rotate said disc intermittently to bring one pocket therein to a position to receive seeds from the hopper and simultaneously to bring another pocket therein into overlying relationship to said space, means operable to eject seeds from each pocket when the latter is brought into overlying relationship to said space, an oscillating arm in the hopper for disturbing the seeds therein adjacent to the marginal portion of said disc which extends into said hopper to cause seeds to gravitate from the hopper into each pocket when the latter is moved to a position to receive seeds from said hopper, and means operable to oscillate said arm once for each increment of rotation of said disc.

3. A seed dropping mechanism comprising a seed hopper, a rotatable horizontally disposed disc having one marginal portion thereof extending into the bottom part of said hopper and another marginal portion thereof overlying a free space through which seeds may gravitate to the soil, said disc having in the marginal portion thereof seed accommodating pockets, means to rotate said disc intermittently to bring one pocket therein to a position to receive seeds from said hopper and simultaneously to bring another pocket therein into overlying relationship to said space, a shaft rockable at regular intervals, means operable by rocking of said shaft to eject seeds from each pocket when the latter is brought into overlying relationship to said space, and means also operable by rocking of said shaft to disturb the seeds in the hopper adjacent to the marginal portion of said disc which extends into said hopper to cause seeds to gravitate from the hopper into each pocket when the latter is moved to a position to receive seeds from said hopper.

4. A seed dropping mechanism comprising a seed hopper, a rotatable horizontally disposed disc having one marginal portion thereof extending into the bottom part of said hopper and another marginal portion thereof overlying a free space through which seeds may gravitate to the soil, said disc having in the marginal portion thereof seed accommodating pockets, means to rotate said disc intermittently to bring one pocket therein to a position to receive seeds from said hopper and simultaneously to bring another pocket therein into overlying relationship to said space, means operable to eject seeds from each pocket when the latter is brought into overlying relationship to said space, an oscillatory shaft disposed vertically in said hopper and having extending laterally therefrom at its lower end a seed disturbing arm disposed adjacent to the bottom of said hopper to sweep across the marginal portion of said disc which extends into said hopper to promote gravitation of seeds into each pocket of said disc when each pocket is moved to a position to receive seeds from said hopper, and means for oscillating said shaft.

5. A seed dropping mechanism comprising a seed hopper, a rotatable horizontally disposed disc having one marginal portion thereof extending into the bottom part of said hopper and another marginal portion thereof overlying a free space through which seeds may gravitate to the soil, said disc having in the marginal portion thereof seed accommodating pockets, means to rotate said disc intermittently to bring one pocket therein to a position to receive seeds from said hopper and simultaneously to bring another pocket therein into overlying relationship to said space, a shaft rockable at regular intervals, means operable by rocking of said shaft to eject seeds from each pocket when the latter is brought into overlying relationship to said space, an oscillatory shaft disposed vertically in said hopper and having extending laterally therefrom at its lower end a seed disturbing arm disposed adjacent to the bottom of said hopper to sweep across the marginal portion of said disc which extends into said hopper to promote gravitation of seeds into each pocket of said disc when each pocket is moved to a position to receive seeds from said hopper, and a connection between said rockable shaft and said oscillatory shaft whereby the former actuates the latter.

JOHN POWELL.

REFERENCES CITED

The following references are of record in the file of this patent:

UNITED STATES PATENTS

| Number | Name | Date |
| --- | --- | --- |
| 359,669 | Davis | Mar. 22, 1887 |
| 2,366,379 | Bemis | Jan. 2, 1945 |